US012670092B2

(12) United States Patent
Shukla et al.

(10) Patent No.: US 12,670,092 B2
(45) Date of Patent: Jun. 30, 2026

(54) IDENTIFYING WORDLINES SUSCEPTIBLE TO DEEPER ERASE CONDITIONS

(71) Applicant: Microchip Technology Incorporated, Chandler, AZ (US)

(72) Inventors: Pitamber Shukla, San Jose, CA (US); Igor Ziper, Sunnyvale, CA (US); Chris Norrie, Castro Valley, CA (US); Srinivas Yelisetti, Fremont, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/751,250

(22) Filed: Jun. 22, 2024

(65) Prior Publication Data

US 2025/0181497 A1    Jun. 5, 2025

Related U.S. Application Data

(60) Provisional application No. 63/606,594, filed on Dec. 5, 2023.

(51) Int. Cl.
*G06F 12/02* (2006.01)

(52) U.S. Cl.
CPC ................................ *G06F 12/0246* (2013.01)

(58) Field of Classification Search
CPC ......... G06F 12/0246; G06F 2212/1036; G06F 2212/7206; G06N 20/00; G11C 11/5635; G11C 16/16; G11C 16/3495
See application file for complete search history.

(56) References Cited

U.S. PATENT DOCUMENTS

| | | | | |
|---|---|---|---|---|
| 6,191,445 B1* | 2/2001 | Fujiwara | ............... | G11C 16/26 257/321 |
| 2007/0047327 A1* | 3/2007 | Goda | .................... | G11C 16/08 365/185.29 |
| 2010/0091566 A1* | 4/2010 | Sato | ................... | G11C 16/0483 365/185.17 |
| 2011/0051521 A1 | 3/2011 | Levy et al. | | |
| 2012/0063231 A1* | 3/2012 | Wood | .................. | G11C 11/5628 365/185.18 |
| 2021/0081313 A1* | 3/2021 | Jang | .................... | G06F 12/0246 |
| 2021/0249094 A1* | 8/2021 | Lee | ........................ | G11C 16/10 |
| 2021/0318954 A1* | 10/2021 | Ke | ...................... | G06F 12/0246 |
| 2022/0027083 A1 | 1/2022 | Zuolo et al. | | |
| 2022/0165348 A1 | 5/2022 | Zuolo et al. | | |

(Continued)

OTHER PUBLICATIONS

International Search Report and Written Opinion, PCT Application No. PCT/US2024/036901, mailed Sep. 25, 2024, 13 pages.

*Primary Examiner* — Tasnima Matin
(74) *Attorney, Agent, or Firm* — Onyx IP Group

(57) ABSTRACT

In some implementations, a controller may identify a block of a memory device that is scheduled for an erase operation. The controller may determine, using a machine learning model or a data structure, whether a wordline of the block is susceptible to a deeper erase condition before the erase operation. The data structure identifies wordlines that are susceptible to deeper erase conditions. The controller may perform a programming operation, on the wordline, to program a predetermined bit pattern on the wordline based on the wordline being susceptible to the deeper erase condition. The controller may perform the erase operation on the block after performing the programming operation.

20 Claims, 13 Drawing Sheets

300

310 — Identify a block of a non-volatile memory device that is scheduled for an erase operation 320 — Determine, using a machine learning model or a data structure, whether a wordline of the block is susceptible to a deeper erase condition before the erase operation 330 — Perform a programming operation, on the wordline, to program a predetermined bit pattern on the wordline based on the wordline being susceptible to the deeper erase condition 340 — Perform the erase operation on the block after performing the programming operation

(56)  References Cited

U.S. PATENT DOCUMENTS

| 2022/0197536 A1* | 6/2022 | Venkataraman | ....... | G11C 16/16 |
| 2023/0154551 A1* | 5/2023 | Ko | ..................... | G11C 16/3445 |
| | | | | 365/185.22 |
| 2023/0343402 A1* | 10/2023 | Bonitz | ................... | G11C 29/42 |
| 2024/0331782 A1* | 10/2024 | Seok | .................. | H01L 25/0657 |

* cited by examiner

150
Training machine learning model using the characterization data

Machine Learning Model
115

145
Generate characterization data based on performing the read operations

Model training platform
110

100

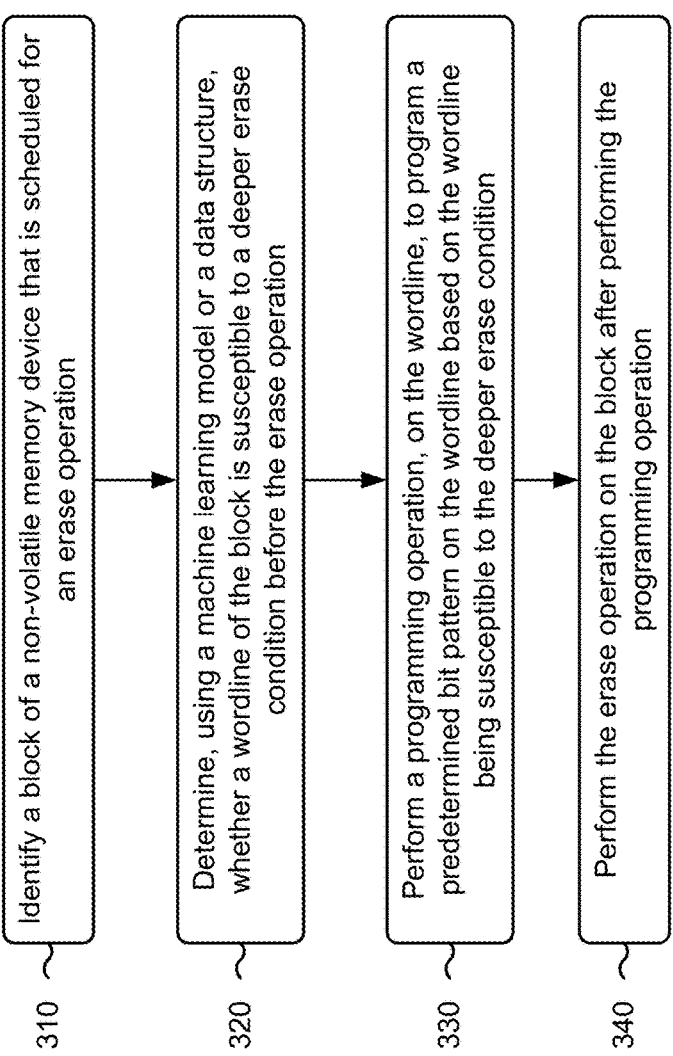

310 — Identify a block of a non-volatile memory device that is scheduled for an erase operation 320 — Determine, using a machine learning model or a data structure, whether a wordline of the block is susceptible to a deeper erase condition before the erase operation 330 — Perform a programming operation, on the wordline, to program a predetermined bit pattern on the wordline based on the wordline being susceptible to the deeper erase condition 340 — Perform the erase operation on the block after performing the programming operation

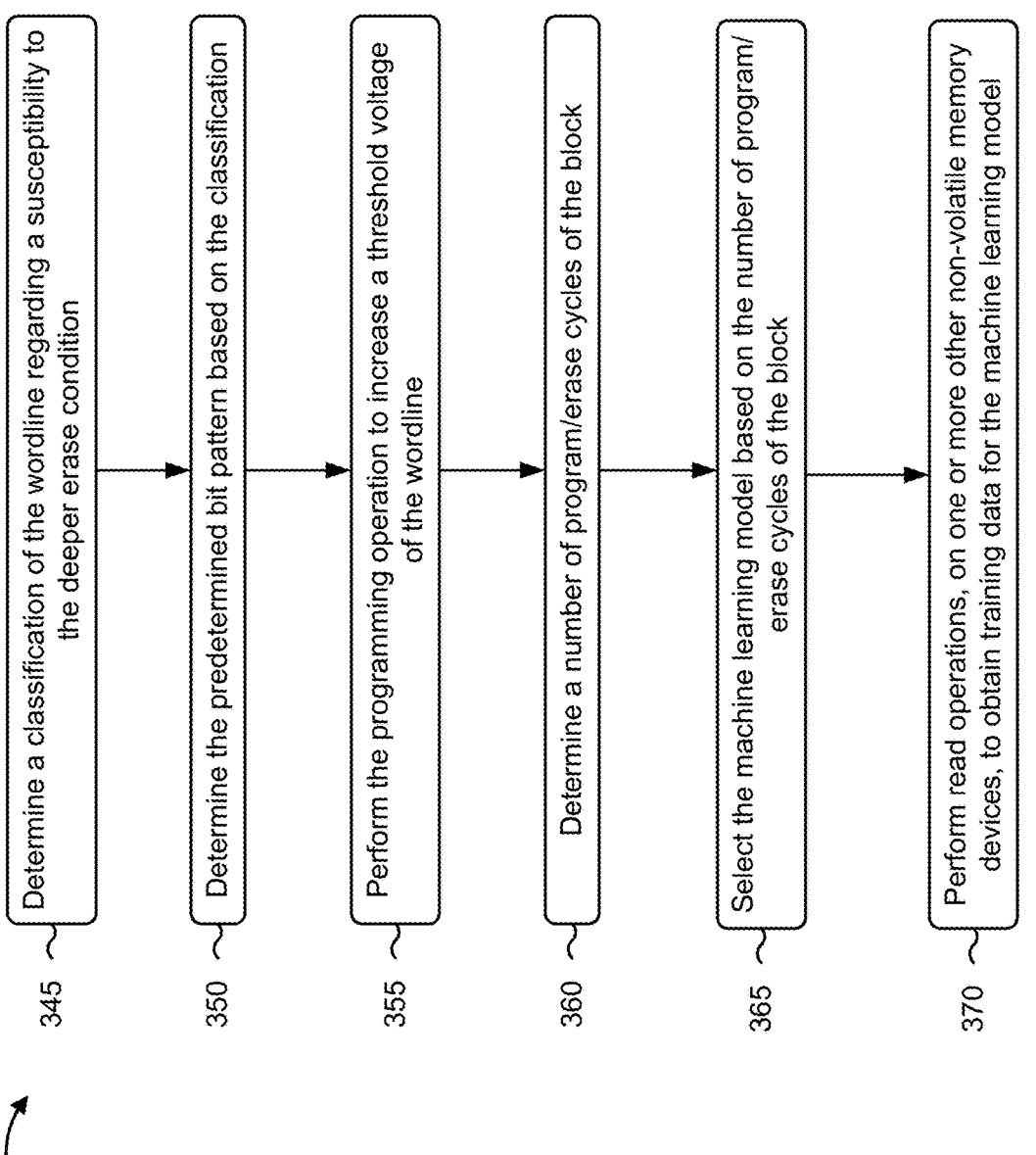

345 — Determine a classification of the wordline regarding a susceptibility to the deeper erase condition 350 — Determine the predetermined bit pattern based on the classification 355 — Perform the programming operation to increase a threshold voltage of the wordline 360 — Determine a number of program/erase cycles of the block 365 — Select the machine learning model based on the number of program/erase cycles of the block 370 — Perform read operations, on one or more other non-volatile memory devices, to obtain training data for the machine learning model

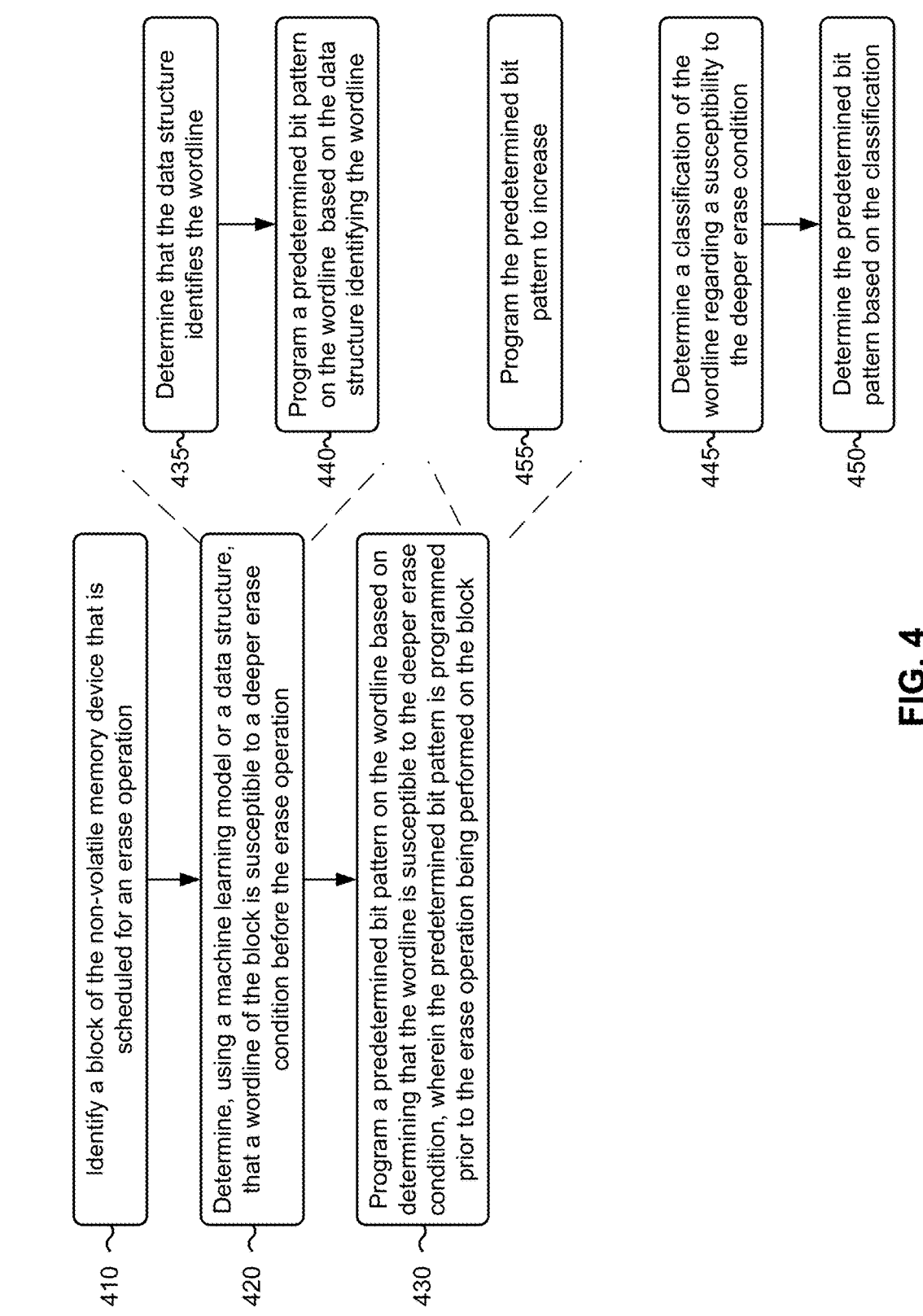

400

410 — Identify a block of the non-volatile memory device that is scheduled for an erase operation 420 — Determine, using a machine learning model or a data structure, that a wordline of the block is susceptible to a deeper erase condition before the erase operation 430 — Program a predetermined bit pattern on the wordline based on determining that the wordline is susceptible to the deeper erase condition, wherein the predetermined bit pattern is programmed prior to the erase operation being performed on the block 435 — Determine that the data structure identifies the wordline 440 — Program a predetermined bit pattern on the wordline based on the data structure identifying the wordline 455 — Program the predetermined bit pattern to increase 445 — Determine a classification of the wordline regarding a susceptibility to the deeper erase condition 450 — Determine the predetermined bit pattern based on the classification

510 — Determine that a wordline, of a block of a non-volatile memory device, is susceptible to a deeper erase condition 520 — Program a predetermined bit pattern on the wordline based on determining that the wordline is susceptible to the deeper erase condition 530 — Perform an erase operation on the block after programming the predetermined bit pattern on the wordline

IDENTIFYING WORDLINES SUSCEPTIBLE TO DEEPER ERASE CONDITIONS

RELATED APPLICATION

This application claims priority to U.S. Provisional Patent Application No. 63/606,594 entitled "MACHINE LEARNING BASED SOLUTION TO IDENTIFY DEEP ERASE WORDLINES FOR SELECTIVE PROGRAMMING FOR UNIFORM ERASE WEAR OF NAND BLOCK," filed Dec. 5, 2023, which is incorporated herein by reference in its entirety.

FIELD

The present disclosure generally relates to erase operations performed on non-volatile memory devices and, for example, relates to identifying wordlines susceptible to deeper erase conditions using a machine learning model.

BACKGROUND

A non-volatile memory device may include a memory device that may store and retain data without external power supply. One example of a non-volatile memory device is a NAND flash memory device. Multiple erase operations may be performed on a block (memory block) of the non-volatile memory device. In some situations, as a result of the multiple erase operations, different wordlines of the block may be subjected to different erase threshold voltages.

SUMMARY

In some implementations, a method comprising: identifying a block of a non-volatile memory device that is scheduled for an erase operation; determining, using a machine learning model or a data structure, whether a wordline of the block is susceptible to a deeper erase condition before the erase operation, wherein the data structure identifies wordlines that are susceptible to deeper erase conditions; performing a programming operation, on the wordline, to program a predetermined bit pattern on the wordline based on the wordline being susceptible to the deeper erase condition; and performing the erase operation on the block after performing the programming operation.

In some implementations, a system comprising: a controller, of a non-volatile memory device, to: identify a block of the non-volatile memory device that is scheduled for an erase operation; determine, using a machine learning model or a data structure, that a wordline of the block is susceptible to a deeper erase condition before the erase operation; and program a predetermined bit pattern on the wordline based on determining that the wordline is susceptible to the deeper erase condition, wherein the predetermined bit pattern is programmed prior to the erase operation being performed on the block.

In some implementations, a computer program product comprising: one or more computer readable storage media, and program instructions collectively stored on the one or more computer readable storage media, the program instructions comprising: program instructions to determine that a wordline, of a block of a non-volatile memory device, is susceptible to a deeper erase condition; program instructions to program a predetermined bit pattern on the wordline based on determining that the wordline is susceptible to the deeper erase condition; and program instructions to perform an erase operation on the block after programming the predetermined bit pattern on the wordline.

BRIEF DESCRIPTION OF THE DRAWINGS

FIGS. 3A-5 is a flowchart of an example process relating to identifying wordlines susceptible to deeper erase conditions.

DETAILED DESCRIPTION OF PREFERRED EMBODIMENTS

Figure 1A:
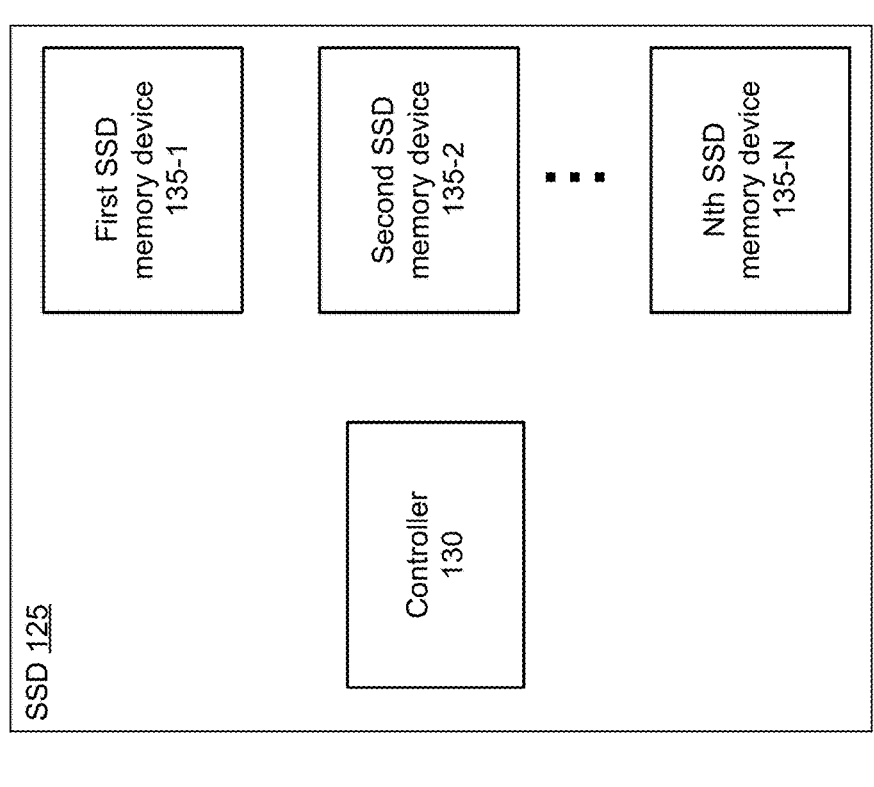
FIGS. 1A-1H are diagrams of an example associated with identifying wordlines susceptible to deeper erase conditions.

The following detailed description of example implementations refers to the accompanying drawings. The same reference numbers in different drawings may identify the same or similar elements.

Multiple erase operations may be performed on a block (or memory block) of a non-volatile memory device. Ideally, as a result of the erase operations, wordlines of the block are to be subject to an erase threshold voltage (for performing erase operations) that is uniform or similar for the wordlines of the block. As used herein, "erase threshold voltage" may refer to a threshold voltage that is used to perform an erase operation. The erase threshold voltage is to be just below an erase verify voltage for the block. However, the wordlines may be subject to a non-uniform or dissimilar erase threshold voltage as a result of the erase operations. As used herein, "erase verify voltage" may refer to a voltage associated with an erase verify operation. For example, the erase verify voltage may refer to a reference voltage associated with an erase verify operation. Electric field variation across a string of wordlines may lead to a variation in the erase threshold voltage (e.g., the non-uniform erase threshold voltage) within the block. In this regard, one or more of the wordlines may be subject to deeper erase conditions.

A "deeper erase condition," as used herein, is a condition where an erase threshold voltage of a cell, after an erase operation, falls far below an expected erase verify voltage. The erase threshold voltage of cells (for the wordline that is easy to erase) may decrease substantially below an erase verify voltage. The decreasing erase threshold voltage, after an erase operation (to erase a block), may indicate that the cell is easy to erase. Such cells may be referred to as "deep erased cells." The deeper erase condition may occur as a result of bowing/ellipticity, twisting, and cell diameter variation of the cells. For example, a reduced diameter (or reduced radius) of the cells may subject the cells to a deeper erase condition. As another example, a non-circular shape of the cells may subject the cells to a deeper erase condition. Ellipticity may cause the same voltage on a cell gate will cause higher electric field as the electric field is inversely proportional to radius.

The cells subject to the deeper erase condition will degrade faster than other cells that are not subject to the deeper erase condition. The degradation will cause the cells to be more prone to errors under various reliability conditions. The degradation of the cells may negatively affect data reliability of the cells, read latency associated with the cells, and the aging of the non-volatile memory device.

Implementations described herein identify one or more wordlines, of a fully (or completely) programmed block of a non-volatile memory device, susceptible to deeper erase conditions. As used herein, "fully programmed" (used in a connection with a particular block) may refer to the particular block being in a state in which valid data, stored on the particular block, is to be copied to an additional block to enable the particular block to be erased. After the particular block is erased, additional data may be written to the particular block. In some situations, the one or more wordlines may be identified after a block (that includes the one or more wordlines) is scheduled for an erase operation subsequent to the block being fully programmed. Additionally, implementations described herein perform selective programming operations on the identified one or more wordlines to prevent the identified one or more wordlines from being subjected to deeper erase conditions. In other words, implementations described herein provide a technical solution to the technical problem of preventing wordlines of block of non-volatile memory devices from being subjected to deeper erase conditions, thereby maintaining or even improving data integrity of the non-volatile memory device.

In some examples, a wordline exhibiting a deeper erase condition may be based on a distribution of threshold voltages associated two overlapped charge states of memory cells of the wordline, as explained herein. As used herein, "overlapped charge states" may refer to adjacent charge states, as described herein. As an example, no charge states may be provided between the overlapped charge states.

Threshold voltages of a charge state (of a cell of the wordline) may be graphically represented using a curve (with values, of the x-axis, representing the threshold voltages). A shape of the curve may indicate a probability distribution for a charge of the cell (e.g., memory cell) when the cell is programmed to a particular value. Curves of two adjacent charge states may overlap. An overlapping region (formed by the curves) may indicate that the charge of the cell is in either a first charge state or in a second charge state of the two overlapped charge states, and is therefore in an indefinite state. A lowest point in a valley created by an overlap (of the curves of the first charge and the second charge state) may provide a statistical probability that distinguishes the first charge state from the second charge state. The valley may be considered a probability distribution that shows a degree of uncertainty. Thus, the lowest point is the point of least uncertainty. The lowest point of the valley indicates a threshold voltage most likely to read the state of the cell as the cell was programmed. The valley may be considered as the overlap of 2 gaussian distribution of the threshold voltages.

In some examples, the overlapped charge states may be associated with lowest threshold voltages, i.e. a threshold voltage associated with an erased cell and a lowest threshold voltage stage. At least a portion of the shape of the valley (also referred to as "valley-0") formed by the curves of the two overlapped charge states may be used to identify cells most impacted by deeper erase conditions. Accordingly, the wordline exhibiting the deeper erase condition may be identified based on at least a portion of the shape of the valley. For example, the wordline exhibiting the deeper erase condition may be identified based on a shape of an upper tail (or right tail) of the curve of the first charge state (e.g., the erase state). As used herein, "upper tail" may refer to a right portion of the curve of the first charge state. Threshold voltages of the first charge state may be lower than threshold voltages of the second charge state. The shape of the valley or the shape of the upper tail of the curve of the first charge state may capture threshold voltages associated with the wordline subjected to a deeper erase condition. In some examples, different overlapped charge states may be used.

In some examples, the wordline may be identified using one or more machine learning models trained to identify wordlines susceptible to deeper erase conditions. For example, the one or more machine learning models may predict (or determine) the shape of the valley or the shape of the upper tail of the curve of the first charge state. Based on the shape of the valley or the shape of the upper tail of the curve of the first charge state, the one or more machine learning models may determine whether the wordline is susceptible to deeper erase conditions.

The one or more machine learning models may be trained using characterization data that is indicative of different shapes of the upper tail of the first charge state or that identifies different shapes of the valley (e.g., valley-0). For example, the characterization data may be generated based on bit error rates resulting from performing read operations at different threshold voltages. For instance, the characterization data may include the different threshold voltages and the bit error rates resulting from the different threshold voltages. Based on the different threshold voltages, the one or more machine learning models may identify the different shapes of the valley or the upper tail and, based on the bit error rates, may identify shapes associated with deeper erase conditions. In another example, based on the different threshold voltages, the one or more machine learning models may identify wordlines associated with deeper erase conditions without first identifying the different shapes of the valley or the upper tail.

Based on the shapes, the one or more machine learning models may identify the wordline susceptible to deeper erase condition. In some examples, the one or more machine learning models may provide, as an output, information regarding the wordline susceptible to deeper erase condition (e.g., information identifying the wordline). In some examples, the one or more machine learning models may provide, as an output, one or more of the information regarding the wordline susceptible to deeper erase condition or information regarding the different shapes. In some implementations, the one or more machine learning models may determine classifications (e.g., two or more) indicating different levels of susceptibility to deeper erase conditions. In some implementations, the one or more machine learning models may be trained using data regarding different program erase cycles (also referred to as "P/E cycles"). In other words, the characterization data may include the data regarding the different program erase cycles. Accordingly, the one or more machine learning models may identify wordlines susceptible to deeper erase condition for different P/E cycles associated with the wordline, as described herein. For example, the one or more machine learning models may be trained to determine a shape of the valley or a shape of the upper tail for the wordline (and other wordlines the fully programmed block) under different P/E cycles.

In some implementations, instead of using the one or more learning models, a data structure (e.g., a look up table) may be used to identify the wordline susceptible to deeper erase condition. The data structure may be generated using the characterization data. For example, the data structure may include information identifying different wordlines that are susceptible to deeper erase conditions based on bit error rates (BER) for various threshold voltages that were used to identify the shape of the valley or the upper tail. In some situations, the data structure may include information identifying different P/E cycles for the different wordlines. In some situations, the data structure may include information identifying different classifications of deeper erase conditions for the different wordlines (e.g., different levels of deeper erase conditions).

A controller, associated with the non-volatile memory device, may use the one or more machine learning models to identify the one or more wordlines susceptible to the deeper erase conditions. In some situations, the controller may determine the number of P/E cycles of the block that includes the wordline and may select a machine learning model trained using a portion of the characterization data (e.g., trained based on information regarding threshold voltages associated with the number of P/E cycles).

After identifying the one or more wordlines, the controller may perform selective programing on the one or more wordlines to program the one or more word lines to a predetermined bit pattern to prevent the deeper erase condition in a subsequent erase operation. For example, the controller may cause the one or more wordlines to be programmed to a predetermined bit pattern (or predetermined pattern of bits) to avoid the deeper erase condition occurring during the subsequent erase operation on the block that includes the one or more wordlines. The one or more wordlines may be programmed to the predetermined bit pattern to adjust threshold voltages of the one or more wordlines. For example, the one or more wordlines may be programmed to the predetermined bit pattern to increase the erase threshold voltages (also referred to as threshold voltage) of the one or more wordlines (because the deeper erase condition decreases the threshold voltages below the erase verify voltage).

Alternatively to programming the one or more wordlines to the predetermined bit pattern, the one or more wordlines may be overwritten by data. Alternatively, the one or more wordlines may be overwritten by single level cell (SLC) programming. Alternatively, the one or more wordlines may be overwritten by a single pulse programming. During SLC programming, one bit may be stored per cell. SLC programming may involve one programming pulse followed by one program verify operation. The single pulse programming may be an operation where the non-volatile memory device issues one programming pulse with a specified voltage and a specified programming pulse width to the one or more wordlines without performing a program verify operation (meaning just one blind program pulse). The SLC programming or the single pulse programming may be faster than using the predetermined bit pattern, such as the predetermined bit pattern "101," The predetermined bit pattern provided herein is used as a non-limiting example. Other bit patterns may be used.

In some implementations, the predetermined bit pattern may be determined based on the upper tail or based on the shape of the valley (e.g., valley-0). In some implementations, a selective programming option (e.g., predetermined bit pattern, SLC programming, or single pulse programming) may be selected to achieve a desirable reliability benefit by avoiding the deeper erase condition. Additionally, the selective programming option may be determined based on a number of P/E cycles. The above manners for selecting the selective programming option, for programming the one or more wordlines before erasing the block, are provided as non-limiting examples.

In some situations, different predetermined bit patterns may be determined for different classifications of susceptibility to deeper erase conditions. For example, a first predetermined bit pattern may be determined for a first classification of susceptibility (to deeper erase conditions), a second predetermined bit pattern may be determined for a second classification of susceptibility (to deeper erase conditions), and so on.

Based on the foregoing, implementations described herein are directed to identifying one or more wordlines of the non-volatile memory device that are susceptible to deeper erase conditions. By identifying the one or more wordlines and by performing selective programming on the one or more wordlines as described herein, implementations described herein may maintain or improve data integrity of the non-volatile memory device, improve read latency of the non-volatile memory device, and also enhance the lifetime of the non-volatile memory device. In some examples, the non-volatile memory device may be a triple-level cell (TLC) NAND flash memory device. While the examples described herein are directed to TLC NAND flash memory devices, implementations described herein are applicable to other types of NAND flash memory devices or other non-volatile memory devices.

FIGS. 1A-1H are diagrams of an example implementation 100 associated with identifying one or more wordlines susceptible to deeper erase conditions, as described herein. As shown in FIG. 1, example implementation 100 includes model training platform 110 which may include a machine learning model 115, a first training memory device 120-1, a second training memory device 120-2, up to an mth training memory device 120-M (collectively "training memory devices 120" and individually "training memory device 120"), and a solid state drive (SSD) 125.

Model training platform 110 may include one or more devices that train one or more machine learning models, as explained herein. Model training platform 110 may include a communication device and a computing device. For example, model training platform 110 may include a server, a laptop computer, a desktop computer, or a similar type of device. In some implementations, model training platform 110 may be a computing device that is part of a computing environment. The communication device may include an interface for communicating with other devices and the computing device may include a combination of one or more processors, controllers, firmware, software, and/or other logic configured to execute computing operations.

As shown in FIG. 1A, model training platform 110 may include machine learning model 115. Model training platform 110 may train machine learning model 115 and provide machine learning model 115 to a controller 130 of SSD 125. In some situations, model training platform 110 may train multiple machine learning models 115. In this regard, model training platform 110 may train and provide one or more machine learning models 115 to SSD 125.

Machine learning model 115 may be trained to identify one or more wordlines susceptible to deeper erase conditions. For example, machine learning model 115 may be trained to determine shapes of a valley (e.g., valley-0) or shapes of an upper tail of the valley-0 and identify the one or more wordlines susceptible to deeper erase conditions based on the shapes, as explained herein. In some implementations, machine learning model 115 may be trained to provide, as an output, information regarding the one or more wordlines, or information regarding the shapes of the valley, or both. In some implementations, machine learning model 115 may provide, as an output (e.g., to controller 130), information identifying the one or more wordlines. In some implementations, machine learning model 115 may provide, as an output, information regarding the shapes of a valley (e.g., valley-0) or shapes of an upper tail of the valley-0, and controller 130 may identify the one or more wordlines based on the output (e.g., based on the shapes). In some examples, machine learning model 115 may include a neural network model.

A training memory device 120 may include a non-volatile memory device, such as a flash memory device. The training memory device 120 may include a single-level cell (SLC) non-volatile memory device. Alternatively, the training memory device 120 may include a multi-level cell (MLC) memory device. Alternatively, the training non-volatile memory device 120 may include a TLC NAND flash memory device. Alternatively, the training memory device 120 may include a quad-level cell (QLC) non-volatile memory device.

The training memory device 120 may be used to generate characterization data (e.g., training data) that is used to train machine learning model 115. In some examples, the characterization data may include different bit error rates corresponding to different threshold voltages used to perform read operations on the training memory device 120 (with the read operations resulting in read errors).

Figure 1B:
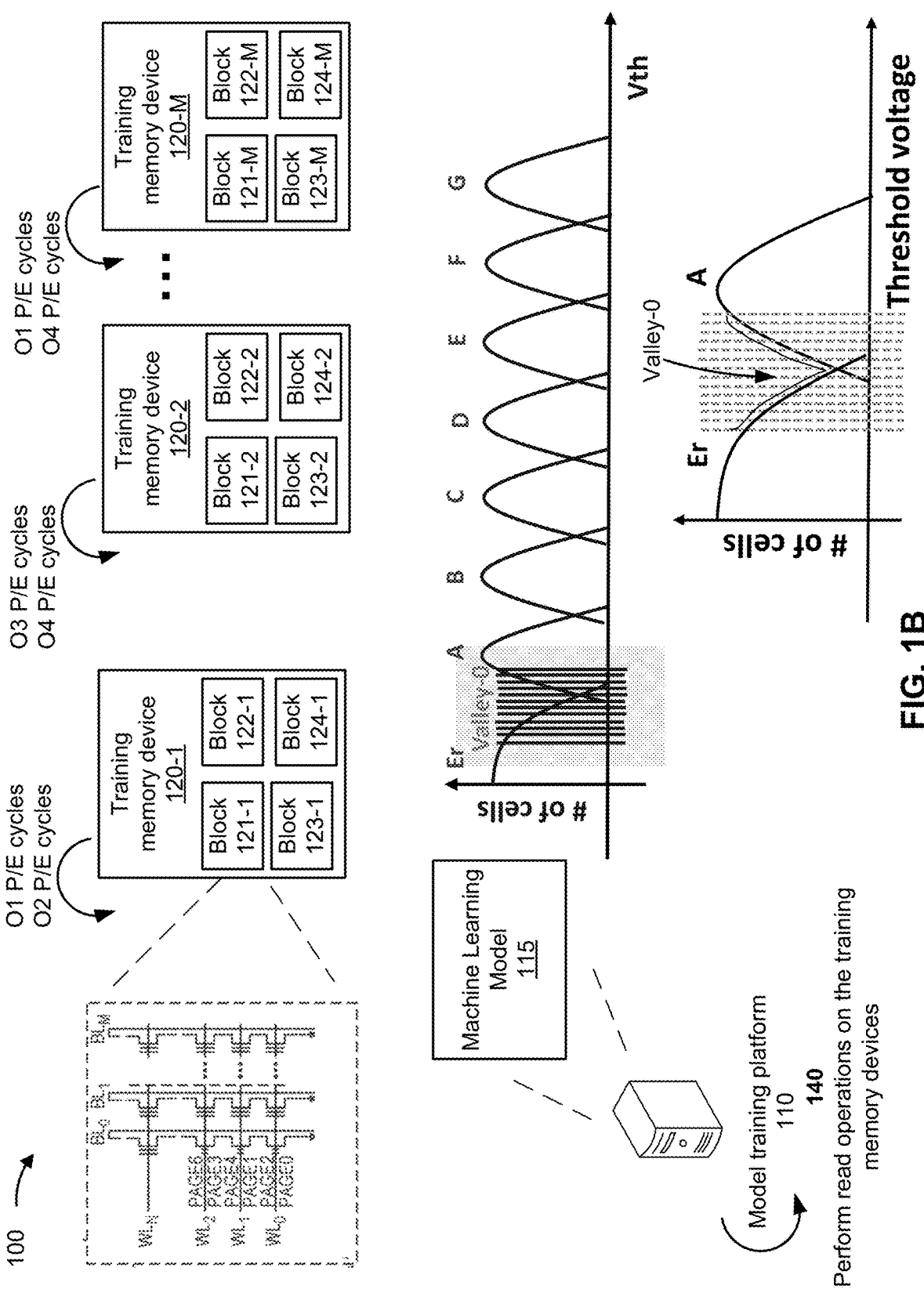

The training memory device 120 may include multiple blocks (or memory blocks) and a block may include multiple wordlines. As shown in FIG. 1B, for example, first training memory device 120-1 may include a first block 121-1, a second block 122-1, and so on. As shown in FIG. 1B, for example, first block 121-1 may include multiple wordlines (e.g., WL$_0$, WL$_1$, and so on) and may include multiple bitlines (e.g., BL$_0$, BL$_1$, and so on).

Referring back to FIG. 1A, SSD 125 may include a solid-state memory device. As shown in FIG. 1A, SSD 125 may include a controller 130, a first SSD memory device 135-1, a second SSD memory device 135-2, up to an nth SSD memory device 135-N (collectively "SSD memory devices 135" and individually "SSD memory device 135").

Controller 130 may include one or more devices to perform operations on SSD memory devices 135. For example, controller 130 may perform read operations, program (write) operations, and erase operations. In some examples, controller 130 may include an application-specific integrated circuit (ASIC) controller. In some examples, controller 130 may include a controller that performs operations using firmware stored on a memory of controller 130 (e.g., stored on a random access memory or read only memory).

In some situations, controller 130 may receive machine learning model 115 from model training platform 110 after machine learning model 115 has been trained. Controller 130 may use machine learning model 115 to identify the one or more wordlines susceptible to deeper erase consideration, as explained herein.

An SSD memory device 135 may include a non-volatile memory device, such as a flash memory device. The SSD memory device 135 may store data of a host computing device (not shown) connected to SSD 125. The SSD memory device 135 may include multiple blocks and multiple wordlines, in a manner similar to the manner explained above in connection with the training memory device 120. The SSD memory device 135 may include an SLC non-volatile memory device, a TLC non-volatile memory device, a QLC non-volatile memory device, or an MLC non-volatile memory device, without limitation.

While examples herein may be described with respect to NAND flash memory device, implementations described herein may be applicable to other types of non-volatile memory devices, such as ferroelectric random-access memory (FeRAM), magnetic random-access memory (MRAM), phase-change memory (PCM), or NOR flash memory devices, among other examples.

As shown in FIG. 1B, training memory devices 120 may be subjected to different P/E cycles. For example, a first block of first training memory device 120-1 may experience a first number of P/E cycles (or a first range of P/E cycles), a second block of second training memory device 120-2 may experience a second number of P/E cycles, among other examples.

As shown in FIG. 1B, and by reference number 140, model training platform 110 may perform read operations on the training memory devices. In some implementations, after training memory devices 120 have experienced different P/E cycles, read operations may be performed on training memory devices 120. In some situations, the read operations may be performed by controllers provided with training memory devices 120. Alternatively, the read operations may be performed by model training platform 110.

As an example, with respect to first training memory device 120-1, after the first block has been fully programmed following the first number of P/E cycles (or the first range of P/E cycles), the read operations may be performed on the first block of first training memory device 120-1. The read operations may be performed using predetermined first threshold voltages. The pre-determined first threshold voltages may be included in in a first range of threshold voltages for a first charge state and a second range of threshold voltages for a second charge state.

In some examples, the first block may include TLC cells. A TLC cell may be associated with eight possible charge states to represent a combinations of 3-bit values stored by the TLC cell. As shown in FIG. 1B, the eight possible charge states may include the first charge state (charge state "Er"), the second charge state (charge state "A"), a third charge state (charge state "B"), and so on. The charge states may be represented by curves of increasing threshold voltages. As shown in FIG. 1B, the first range of threshold voltages (of the first charge state) may form a first curve, the second range of threshold voltages (of the second charge state) may form a second curve, and so on. The eight curves may create seven valleys. The shape of a curve is a probability distribution for the charge of the cell when programmed to a particular value. The first charge state may be an erase state. In this regard, the shape of the valley (valley-0) formed by the first curve (of the erase state) and the second curve may be a good proxy to identify wordlines susceptible to deeper erase conditions.

The first charge state and the second charge state may be overlapped charge states. In some examples, the read operations may include tens of read operations performed using the pre-determined first threshold voltages. The threshold voltages of the read operations may capture a shape of the valley (valley-0) formed by the first curve and the second curve. Additionally, the threshold voltages of the read operations may capture a shape of an upper tail of the first curve. As explained herein, the shape of the upper tail of the first curve may indicate a susceptibility to deeper erase conditions. As explained herein (e.g., in connection with FIG. 1C), the upper tail of the first curve may refer to a right side of the curve.

When multiple curves overlap (such as the curves for the first charge state and for the second charge state), the overlapping region means the charge in that cell could indicate either the Er state of the A state. The lowest point in the valley created by the overlap identifies a threshold voltage that gives the best statistical probability that distinguishes the Er state from the A state. The valley (formed by the overlapped curves) may be considered a probability distribution that shows a degree of uncertainty. Thus, the lowest point is the point of least uncertainty. The lowest point of the valley indicates the threshold voltage most likely to read the state of the cell as the cell was programmed. The threshold voltage may be a threshold voltage that is most likely to correctly distinguish a cell in the Er state versus the A state. Thus, knowing (or predicting) via machine learning (ML) the shape of the curve and the lowest point of the valley increases the likelihood of reading the correct state from that cell.

Figure 1C:
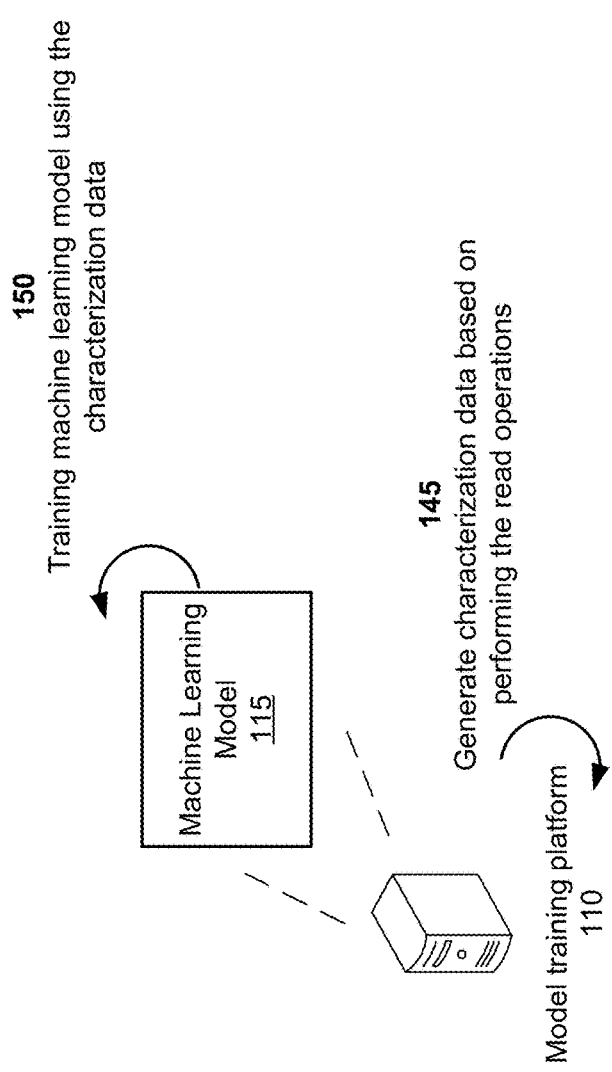

As shown in FIG. 1C, and by reference number 145, model training platform 110 may generate characterization data. The characterization data may include training data that is used to train machine learning model 115. The characterization data may be generated based on performing the read operations to determine deeper erase conditions for different wordlines of the first block, as explained herein. For example, data regarding the read operations may be used to determine the shape of the valley (valley-0) and determine the shape of the upper tail. As a quantity of the read operations increases, the shape of the valley and the shape of the upper tail may be refined.

The characterization data may include information regarding the pre-determined first threshold voltages (used to perform the read operations), regarding the read errors associated with using the pre-determined first threshold voltages, regarding the bit error rates associated with using the pre-determined first threshold voltages, or regarding identification of wordlines that are read during the read operations, without limitation.

Figure 1D:
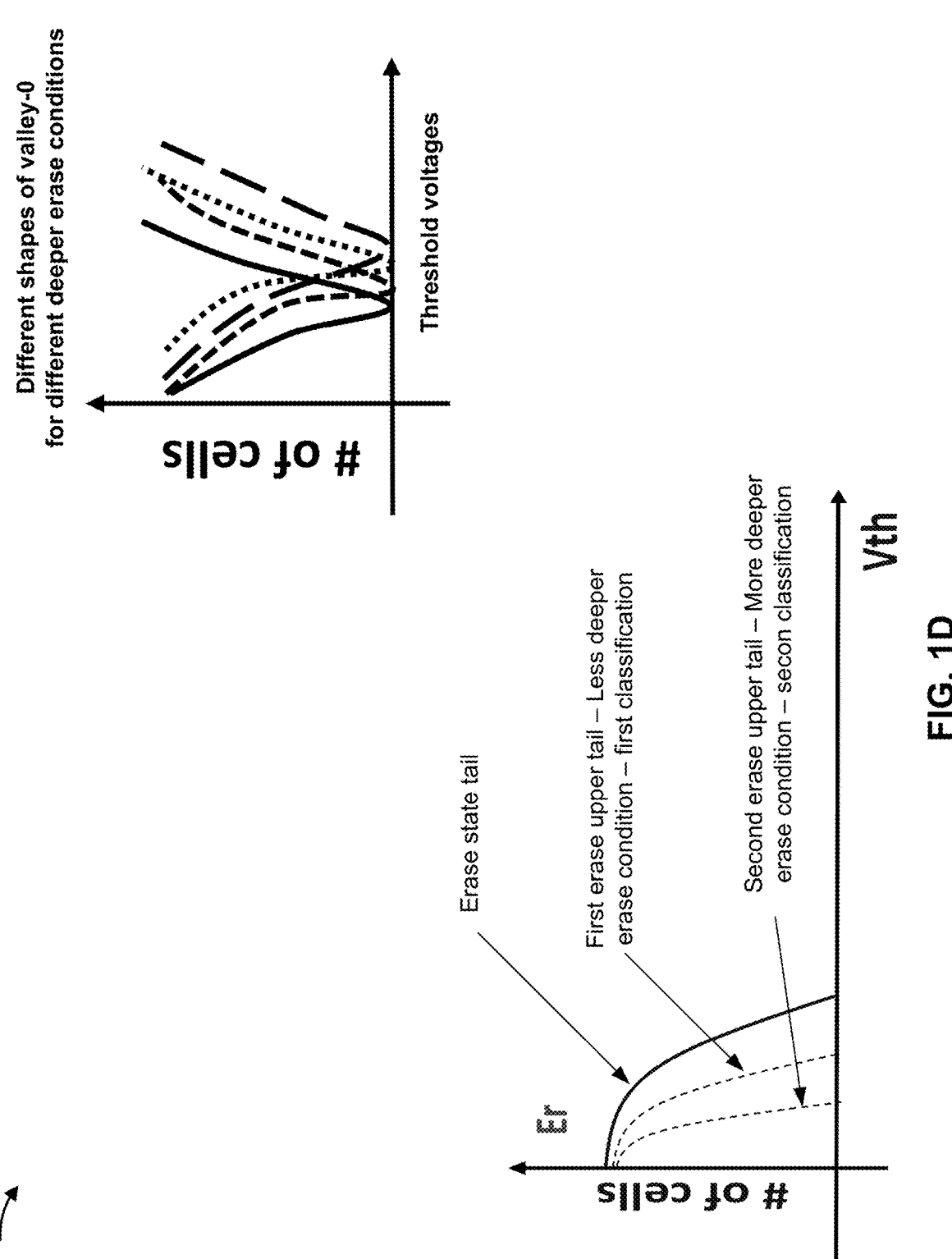

As shown in FIG. 1D, the characterization data may indicate different valley shapes (of the valley-0) for different wordlines of the first block. For example, as shown in FIG. 1D, the valley shape (for a first wordline of the first block) is illustrated by a solid line, the valley shape (for a second wordline of the first block) is illustrated by a dashed line of a first pattern, the valley shape (for a third wordline of the first block) is illustrated by a dashed line of a second pattern, and so on. The different valley shapes of the valley-0 may illustrate different classifications (or levels) of deeper erase conditions.

As also shown in FIG. 1D, the characterization data may indicate different upper tail shapes (of the upper tail of the first charge state) for different wordlines of the first block. For example, as shown in FIG. 1D, the upper tail shape (for a first wordline of the first block) is illustrated by a solid line, the upper tail shape (for a second wordline of the first block) is illustrated by a dashed line of a first pattern, the upper tail shape (for a third wordline of the first block) is illustrated by a dashed line of a second pattern, and so on.

The different shapes of the upper tail may illustrate different classifications (or levels) of cells susceptible to deeper erase conditions. For example, the upper tail shape for the first wordline may indicate that the first wordline is not subject to a deeper erase condition. The upper tail shape for the second wordline may indicate that the second wordline is subject to a first classification of a deeper erase condition. The upper tail shape for the third wordline may indicate that the third wordline is subject to a second classification of a deeper erase condition. The second classification may be associated with a deeper erase condition with a more negative effect than a deeper erase condition associated with the first classification. In this regard, as shown in FIG. 1D, the threshold voltages for the second wordline may exceed the threshold voltages for the third wordline. The characterization data may include information identifying the different wordlines (e.g., identifying locations of the different wordlines).

Referring back to FIG. 1C, and by reference number 150, model training platform 110 may train machine learning model 115 using the characterization data. In some implementations, model training platform 110 may train machine learning model 115 to determine effects of deeper erase conditions on wordlines of the first block of first training memory device 120-1 and, more generally, to determine effects of deeper erase conditions on wordlines of other blocks of first training memory device 1201-1 and of other non-volatile memory devices. The effects may be determined based on bit error rates corresponding to the first pre-determined threshold voltages (e.g., based on read errors caused by the first pre-determined threshold voltages). For example, machine learning model 115 may be trained to determine one or more shapes of the upper tail of the first charge state. The one or more shapes may be a proxy for different classifications (or levels) of deeper erase conditions subjected to by the different wordlines of the first block. In other words, the one or more shapes may be used to determine effects of deeper erase conditions on the different wordlines.

Training memory device 120 may include different types of non-volatile memory devices. In some situations, the different types of non-volatile memory devices may be manufactured by different manufacturers. Accordingly, machine learning model 115 may be trained to determine different shapes of the upper tail of the first charge state for the different types of non-volatile memory devices.

In some examples, machine learning model 115 may receive, as an input, bit error rates corresponding to pre-determined threshold voltages that caused read errors. In some examples, the input may additionally include one or more of P/E cycles, or temperatures, among other examples. Machine learning model 115 may provide, as an output, information regarding current classifications of deeper erase conditions for different wordlines. As the different wordlines are subjected to additional program/erase cycles, machine learning model 115 may provide, as an output, information regarding updated classifications of deeper erase conditions. In some examples, the updated classifications may indicate worse deeper erase conditions on the different wordlines than the deeper erase conditions indicated by the current classifications.

While the example described has been provided with respect to overlapped charge states with lowest threshold voltages, implementations described herein may be applicable to other overlapped charge states. In some implementations, machine learning model 115 may be trained by a computing device other than model training platform 110.

In some implementations, model training platform 110 may train multiple machine learning models 115 associated with different P/E cycles. For example, model training platform 110 may train a first machine learning model using the characterization data regarding different deeper erase conditions after a first P/E cycle (or after a first range of P/E cycles); may train a second machine learning model using the characterization data regarding different deep erase conditions after a second P/E cycle (or after a ran range of program/erase cycles); and so on.

In some implementations, the actions described above (e.g., the read operations, generating the characterization data, and training machine learning model 115) may be performed as a background operation. By performing the above actions as a background operation, implementations described herein may prevent negative impacts during operation of training memory devices 120. With respect to the actions described above, the characterization data may be used to identify different shapes of the upper tail of the first charge, machine learning model 115 may be trained to determine how the shapes can be identified from an input (e.g., a data-point sample or real time data of an SSD memory device 135) and to perform an inference to determine where the sample fits on the shapes described herein. A result of the inference may be used to determine an action to perform for wordlines that are identified as subjected to deeper erase conditions.

Figure 1E:
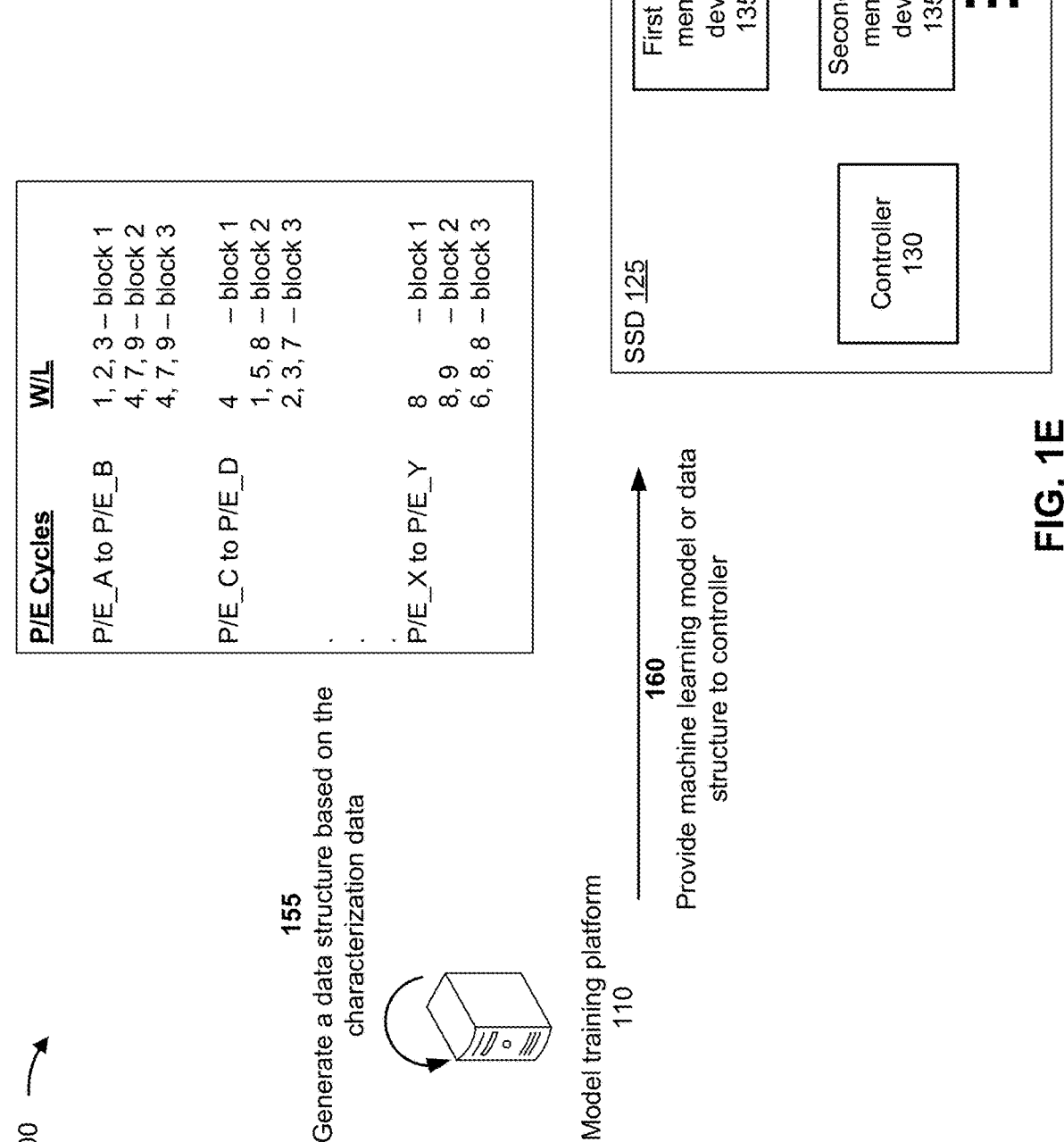

As shown in FIG. 1E, and by reference number 155, model training platform 110 may generate a data structure based on the characterization data. In some examples, the data structure may be a table (e.g., a lookup table) that includes information regarding program/erase cycles and regarding wordlines of different blocks that have been identified as being susceptible to (or subjected to) deeper erase conditions. As shown in FIG. 1E, for example, the data structure may identify a first range of program/erase cycles (P/E_A to P/E_B) and identify different wordlines (e.g., 1, 2, 3, 4, 7, 9), of different blocks (e.g., 1, 2, 3), that have been identified as being susceptible to (or subjected to) deeper erase conditions for the first range of program/erase cycles. As also shown in FIG. 1E, the data structure may identify a second range of program/erase cycles (P/E_C to P/E_D) and identify different wordlines (e.g., 4, 1, 5, 8, 2, 3, 7), of different blocks (e.g., 1, 2, 3), that have been identified as being susceptible to (or subjected to) deeper erase conditions for the second range of program/erase cycles. In some situations, the data structure may include information regarding classifications of the deeper erase conditions for the different wordlines.

As shown in FIG. 1E, and by reference number 160, model training platform 110 may provide a machine learning model (e.g., machine learning model 115) or the data structure to controller 130. For example, after training machine learning model 115, model training platform 110 may provide machine learning model 115 to the controller 130. In some implementations, controller 130 may use machine learning model 115 to determine information regarding deeper erase conditions for different wordlines of SSD 125, including classifications of deeper erase conditions for different wordlines of SSD 125. In some implementations, controller 130 may use the data structure to determine information regarding deeper erase conditions for the different wordlines of SSD 125.

Figure 1F:
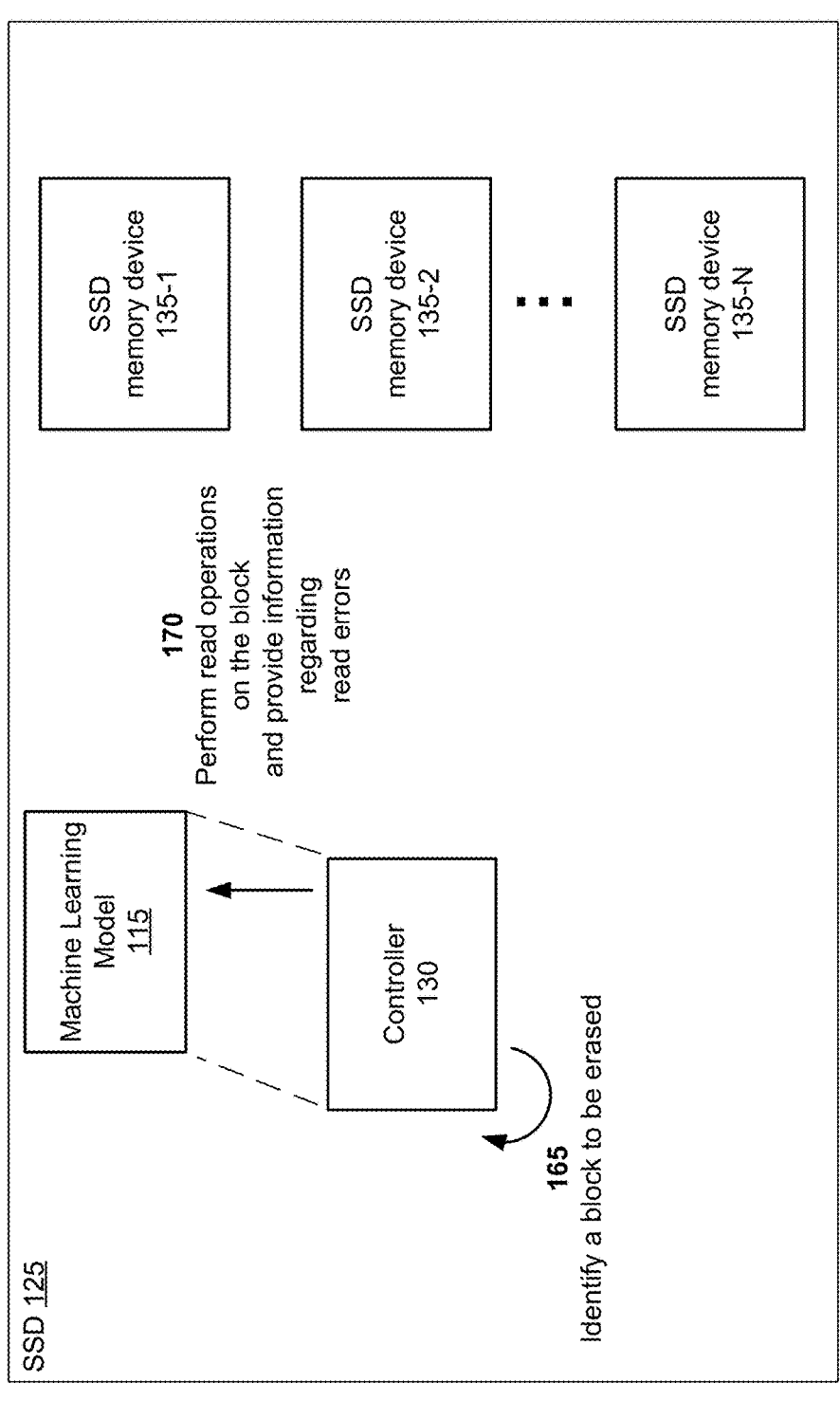

As shown in FIG. 1F, and by reference number 165, controller 130 may identify a block to be erased. For example, one or more blocks, of an SSD memory device 135, may be scheduled (or queued) for an erase operation. The one or more blocks may be scheduled for the erase operation after the one or more blocks have been fully programmed. Controller 130 may receive information regarding the one or more blocks of the SSD memory device 135. As an example, the SSD memory device 135 may include a first SSD memory device 135-1.

As shown in FIG. 1F, and by reference number 170, controller 130 may perform read operations on the block and provide information regarding read errors. For example, controller 130 may perform read operations on the block of first SSD memory device 135-1. In some implementations, controller 130 may perform the read operations using default threshold voltages (e.g., default read levels that may be used as a first guess which was provided by first SSD memory device 135-1).

For example, model training platform 110 may provide (to machine learning model 115) information identifying bit error rates corresponding to the pre-determined threshold voltages. In some situations, the pre-determine threshold voltages may be default threshold voltages. In some examples, controller 130 may provide, as part of the inputs, information regarding a number of P/E cycles regarding the block and information regarding wordlines of the block. In some examples, the information regarding the wordlines may include one or more of: threshold voltages associated with the wordlines, information regarding error rates (e.g., bit error rates) associated with the wordlines, and information regarding a frequency of access and pattern of access of the wordlines, among other examples.

In some instances, controller 130 may analyze P/E information, regarding the block, to determine the number of P/E cycles regarding the block. Controller 130 may select a machine learning model based on the number of P/E cycles regarding the block. For example, controller 130 may select a machine learning model that has been trained with the characterization data of one or more training memory devices 120 that have experienced the number of P/E cycles. As indicated above, the number of P/E cycles may be indicative of a range of P/E cycles for what a particular machine learning model has been trained.

Figure 1G:
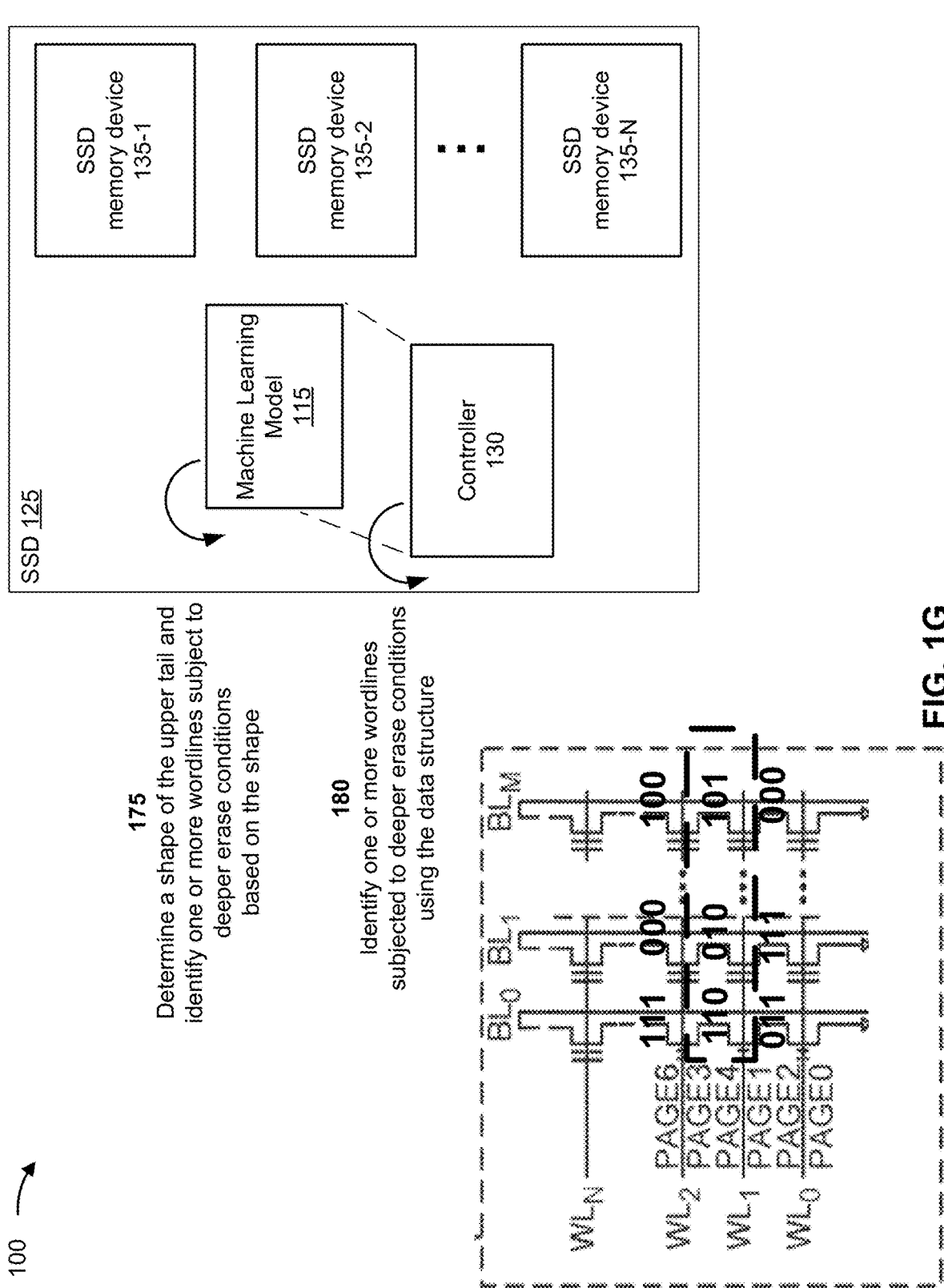

As shown in FIG. 1G, and by reference number 175, machine learning model 115 may determine a shape of the upper tail and identify one or more wordlines susceptible to deeper erase conditions based on the shape. In some implementations, controller 130 may use machine learning model 115 to identify the one or more wordlines (of the block) susceptible to deeper erase conditions. For example, controller 130 may provide bit error rates (corresponding to the default threshold voltages) as inputs to machine learning model 115. The inputs may also include the default threshold voltages.

Machine learning model 115 may use the bit error rates (and the default threshold voltages) to predict (or determine) a shape of a valley of the overlapped charge states (e.g., a shape of valley-0). In some situations, machine learning model 115 may predict (or determine) a distribution of threshold voltages based on the inputs. Machine learning model 115 may determine the shape of the valley or the shape of the upper tail based on the distribution of threshold voltages. Machine learning model 115 may recognize the shape of the upper tail as a pattern of threshold voltages (or signature of threshold voltages) of wordlines that are susceptible to a deeper erase condition.

Machine learning model 115 may provide, as an output, information identifying one or more wordlines that have been identified as being susceptible to (or subjected to) a deeper erase condition. As shown in FIG. 1G, machine learning model 115 may identify a wordline WL as a wordline that has been subject to a deeper erase condition. In some implementations, machine learning model 115 may provide, as an output, information identifying the shape of the upper tail and controller may use the information to identify the one or more wordlines.

As shown in FIG. 1G, and by reference number 180, controller 130 may identify one or more wordlines susceptible to deeper erase conditions using the data structure. In some implementations, controller 130 may use the data structure to identify the one or more wordlines as being susceptible to (or subjected to) a deep erase condition. For example, as explained above, controller 130 may analyze P/E information, regarding the block, to determine the number of P/E cycles regarding the block. Controller 130 may search the data structure (or perform a lookup operation) using the number of P/E cycles. Based on the search, controller 130 may identify the one or wordlines corresponding to the number of program/erase cycles for the block, the read counts, among other examples. As shown in FIG. 1G, the bits (programmed on the wordlines) may be associated with different charge states.

Figure 1H:
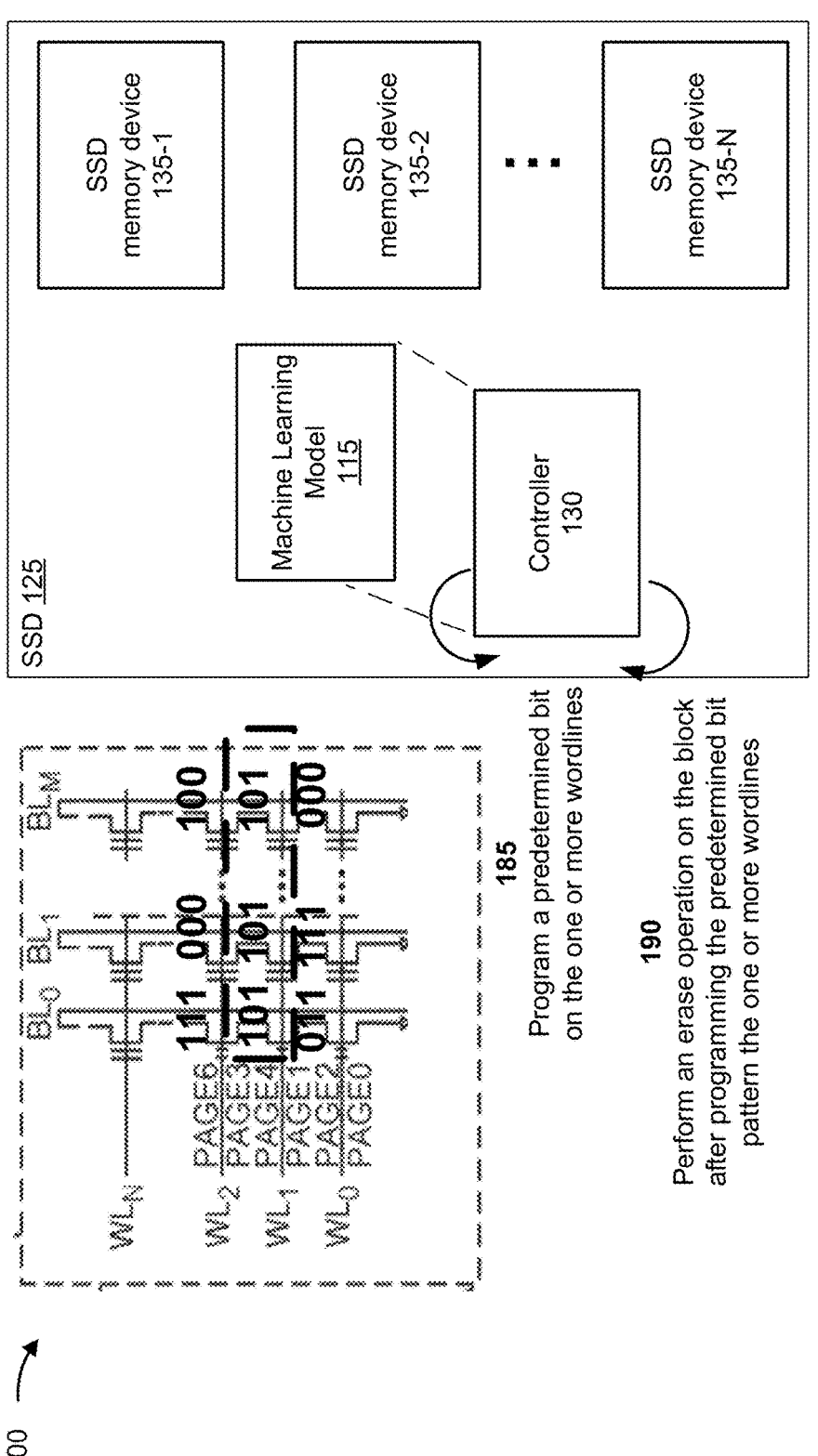

As shown in FIG. 1H, and by reference number 185, controller 130 may program a predetermined bit pattern on the one or more wordlines. For example, after identifying the one or more wordlines, controller 130 may perform a programming operation, on the one or more wordlines, to program the predetermined bit pattern on the one or more wordlines, based on the one or more wordlines being susceptible to the deep erase condition. As shown in FIG. 1H, as an example, controller 130 may program the predetermined bit pattern "101" on the wordline $WL_1$. In some examples, the wordline may be a wordline that is most susceptible to the deeper erase condition out of wordlines of the block. As explained herein, the predetermined bit pattern may be based on a classification of the deep erase consideration.

As shown in FIG. 1H, and by reference number 190, controller 130 may perform an erase operation on the block after programming the predetermined bit pattern on the one or more wordlines.

By determining the shape of the upper tails or the shape of the valley (as disclosed herein), implementations described herein may identify one or more word lines susceptible to deeper erase conditions (as disclosed herein). Based on identifying the one or more word lines, implementations described herein may perform selective programming to prevent the deeper erase condition in a subsequent erase operation (as disclosed herein). Accordingly, implementations described herein maintain, or improve, data integrity of the non-volatile memory device, improve read latency of the non-volatile memory device, and also enhance the lifetime of the drive. Additionally, the selective programming option may be determined dynamically by comparing the upper tail of a word line within a block after a programming operation (as a background operation) and an erase verify operation.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
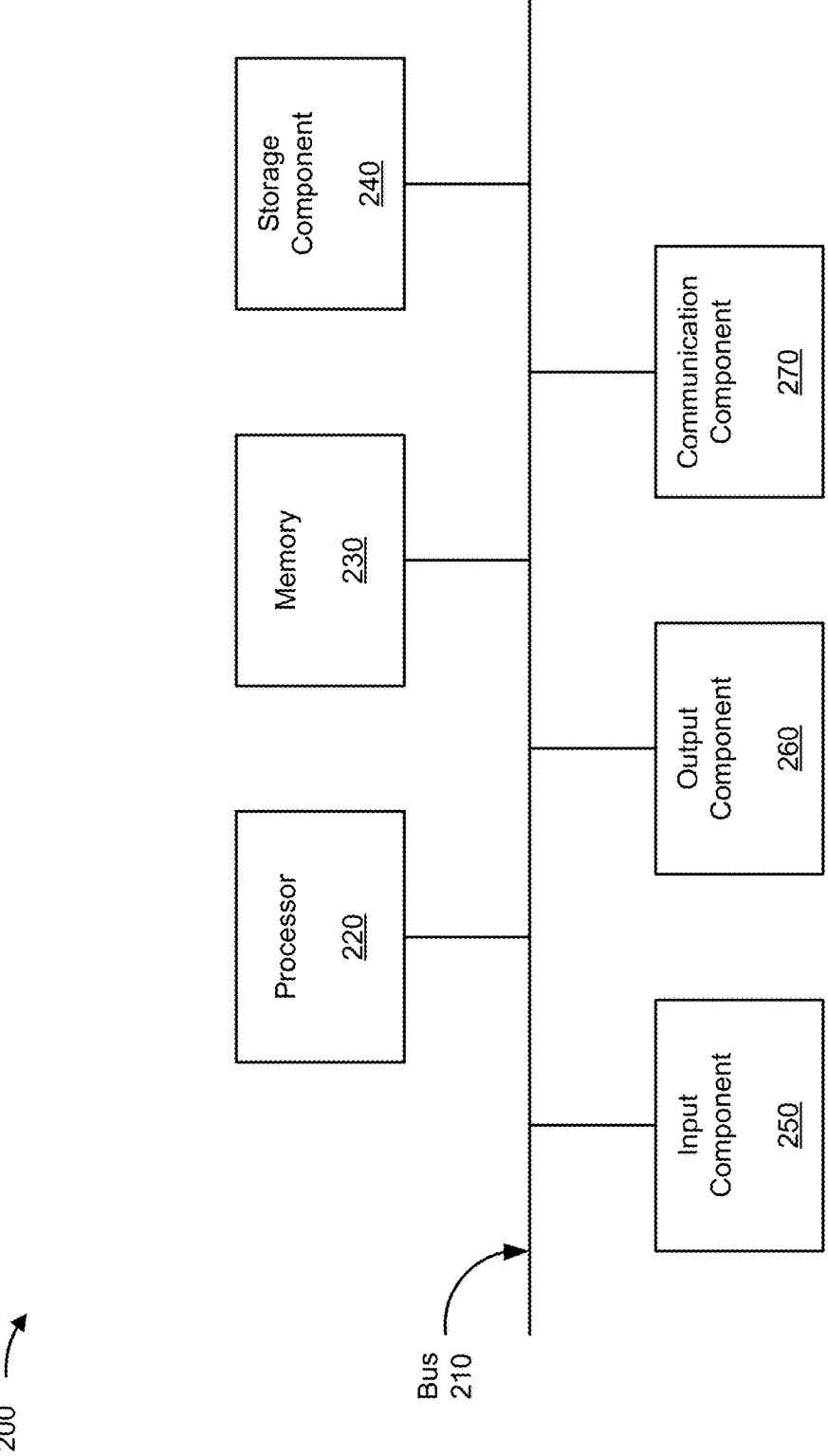
FIG. 2 is a diagram of example components of one or more devices of FIG. 2.

FIG. 2 is a diagram of example components of a device 200, which may correspond to one or more devices of FIG. 1, such as model training platform 110. In some implementations, model training platform 110 may include one or more devices 200 and one or more components of device 200. As shown in FIG. 2, device 200 may include a bus 210, a processor 220, a memory 230, a storage component 240, an input component 250, an output component 260, and a communication component 270.

Bus 210 includes a component that enables wired or wireless communication among the components of device

200. Processor 220 may be a central processing unit, a graphics processing unit, a microprocessor, a controller, a microcontroller, a digital signal processor, a field-programmable gate array, an application-specific integrated circuit, or another type of processing component. Processor 220 is implemented in hardware, firmware, or a combination of hardware and software. In some implementations, processor 220 includes one or more processors capable of being programmed to perform a function. Memory 230 includes a random access memory, a read only memory, or another type of memory (e.g., a flash memory, a magnetic memory, or an optical memory).

Storage component 240 stores information or software related to the operation of device 200. For example, storage component 240 may include a hard disk drive, a magnetic disk drive, an optical disk drive, a solid state disk drive, a compact disc, a digital versatile disc, or another type of non-transitory computer-readable medium. Input component 250 enables device 200 to receive input, such as user input or sensed inputs. For example, input component 250 may include a touch screen, a keyboard, a keypad, a mouse, a button, a microphone, a switch, a sensor, a global positioning system component, an accelerometer, a gyroscope, or an actuator. Output component 260 enables device 200 to provide output, such as via a display, a speaker, or one or more light-emitting diodes. Communication component 270 enables device 200 to communicate with other devices, such as via a wired connection or a wireless connection. For example, communication component 270 may include a receiver, a transmitter, a transceiver, a modem, a network interface card, or an antenna.

Device 200 may perform one or more processes described herein. For example, a non-transitory computer-readable medium (e.g., memory 230 or storage component 240) may store a set of instructions (e.g., one or more instructions, code, software code, or program code) for execution by processor 220. Processor 220 may execute the set of instructions to perform one or more processes described herein. In some implementations, execution of the set of instructions, by one or more processors 220, causes the one or more processors 220 or the device 200 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 2 are provided as an example. Device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

FIG. 3A is a flowchart of an example process 300 associated with identifying wordlines susceptible to deeper erase conditions. In some implementations, one or more process blocks of FIG. 3A may be performed by a controller (e.g., controller 130). In some implementations, one or more process blocks of FIG. 3A may be performed by another device or a group of devices separate from or including the controller, such as a model training platform (e.g., model training platform 110) and/or an SSD (e.g., SSD 125). Additionally, or alternatively, one or more process blocks of FIG. 3A may be performed by one or more components of device 200, such as processor 220, memory 230, storage component 240, input component 250, output component 260, and/or communication interface 270.

As shown in FIG. 3A, process 300 may include identifying a block of a non-volatile memory device that is scheduled for an erase operation (block 310). For example, the controller may identify a block of a non-volatile memory device that is scheduled for an erase operation, as described above.

As further shown in FIG. 3, process 300 may include determining, using a machine learning model or a data structure, whether a wordline of the block is susceptible to a deeper erase condition before the erase operation (block 320). For example, when using the machine learning model, the controller may predict whether the wordline of the block is susceptible to a deeper erase condition before the erase operation. When using the data structure, the controller may determine whether the wordline of the block is susceptible to a deeper erase condition before the erase operation. In some implementations, the data structure identifies wordlines that are susceptible to deeper erase conditions.

In some implementations, the machine learning model is trained to determine, based on read operations performed on the wordline after the block has been programmed, a first distribution of threshold voltages for a first charge state of the wordline or a second distribution of threshold voltages for a particular range of threshold voltages of two overlapped charge states, wherein the first distribution of threshold voltages for the first charge state is a distribution of threshold voltages of an erase upper tail, wherein the two overlapped charge states are charge states with lowest threshold voltages, and wherein determining whether the wordline of the block is susceptible to the deeper erase condition comprises determining whether the wordline of the block is susceptible to the deeper erase condition based on the first distribution of threshold voltages.

As further shown in FIG. 3A, process 300 may include performing a programming operation, on the wordline, to program a predetermined bit pattern on the wordline based on the wordline being susceptible to the deeper erase condition (block 330). For example, the controller may perform a programming operation, on the wordline, to program a predetermined bit pattern on the wordline based on the wordline being susceptible to the deeper erase condition, as described above.

As further shown in FIG. 3A, process 300 may include performing the erase operation on the block after performing the programming operation (block 340). For example, the controller may perform the erase operation on the block after performing the programming operation, as described above. In some implementations, the predetermined bit pattern is selected based on a classification of the deeper erase condition.

In some implementations, as shown in FIG. 3B, determining whether the wordline is susceptible to the deeper erase condition comprises determining a classification of the wordline regarding a susceptibility to the deeper erase condition after determining that the wordline is susceptible to the deeper erase condition (block 345), and determining the predetermined bit pattern based on the classification (block 350).

In some implementations, performing the programming operation comprises performing the programming operation to increase a threshold voltage of the wordline (block 355).

In some implementations, the machine learning model is included in a plurality of machine learning models associated with different program/erase cycles, and wherein the method comprises determining a number of program/erase cycles of the block (block 360), and selecting the machine learning model based on the number of program/erase cycles of the block (block 365).

In some implementations, process 300 includes performing read operations, on one or more other non-volatile memory devices, to obtain training data for the machine learning model (block 370).

Although FIGS. 3A-3B shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 4 is a flowchart of an example process 400 associated with identifying wordlines susceptible to deeper erase conditions. In some implementations, one or more process blocks of FIG. 4 may be performed by a controller (e.g., controller 130). In some implementations, one or more process blocks of FIG. 4 may be performed by another device or a group of devices separate from or including the controller, such as a model training platform (e.g., model training platform 110) and/or an SSD (e.g., SSD 125). Additionally, or alternatively, one or more process blocks of FIG. 4 may be performed by one or more components of device 200, such as processor 220, memory 230, storage component 240, input component 250, output component 260, and/or communication interface 270.

As shown in FIG. 4, process 400 may include identifying a block of the non-volatile memory device that is scheduled for an erase operation (block 410). For example, the controller may identify a block of the non-volatile memory device that is scheduled for an erase operation, as described above.

As further shown in FIG. 4, process 400 may include determining, using a machine learning model or a data structure, that a wordline of the block is susceptible to a deeper erase condition before the erase operation (block 420). For example, the controller may predict, using a machine learning model, that a wordline of the block is susceptible to a deeper erase condition before the erase operation, as described above. Alternatively, the controller may determine, using a data structure, that the wordline of the block is susceptible to a deeper erase condition before the erase operation, as described above. In some implementations, the machine learning model comprises a plurality of machine learning models, and wherein the controller is to select the machine learning model, from the plurality of machine learning models, based on a number of program erase cycles of the one or more blocks. In some implementations, the data structure identifies different wordlines for different program erase cycles. For example, the data structure may identify one or more first wordlines that are susceptible to deeper erase conditions after a first number of P/E cycles, identify one or more second wordlines that are susceptible to deeper erase conditions after a second number of P/E cycles, and so on. In some implementations, the wordline is a wordline that is most susceptible to the deeper erase condition out of wordlines of the block.

As further shown in FIG. 4, process 400 may include programming a predetermined bit pattern on the wordline based on determining that the wordline is susceptible to the deeper erase condition, wherein the predetermined bit pattern is programmed prior to the erase operation being performed on the block (block 430). For example, the controller may program a predetermined bit pattern on the wordline based on determining that the wordline is susceptible to the deeper erase condition, as described above. In some implementations, the predetermined bit pattern is programmed prior to the erase operation being performed on the block. In some implementations, process 400 may include performing the erase operation on the block after programming the predetermined bit pattern on the wordline.

In some implementations, the controller is to determine that the data structure identifies the wordline (block 435), and program a predetermined bit pattern on the wordline based on the data structure identifying the wordline (block 440).

In some implementations, process 400 includes determining a classification of the wordline regarding a susceptibility to the deeper erase condition (block 445), and determining the predetermined bit pattern based on the classification (block 450).

In some implementations, process 400 includes programming the predetermined bit pattern to increase a threshold voltage of the wordline (block 455).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
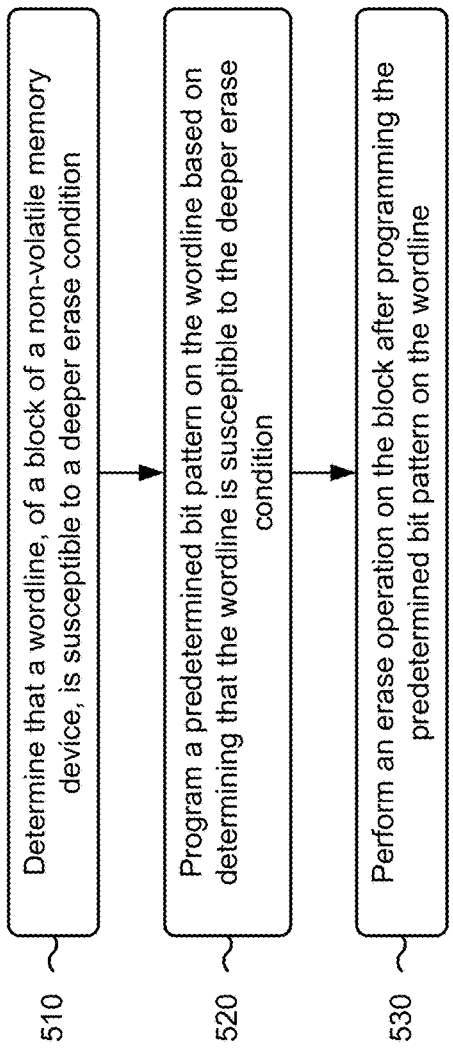

FIG. 5 is a flowchart of an example process 500 associated with identifying wordlines susceptible to deeper erase conditions. In some implementations, one or more process blocks of FIG. 5 may be performed by a controller (e.g., controller 130). In some implementations, one or more process blocks of FIG. 5 may be performed by another device or a group of devices separate from or including the controller, such as a model training platform (e.g., model training platform 110) and/or an SSD (e.g., SSD 125). Additionally, or alternatively, one or more process blocks of FIG. 5 may be performed by one or more components of device 200, such as processor 220, memory 230, storage component 240, input component 250, output component 260, and/or communication interface 270.

As shown in FIG. 5, process 500 may include determining that a wordline, of a block of a non-volatile memory device, is susceptible to a deeper erase condition (block 510). For example, the controller may program instructions to determine that a wordline, of a block of a non-volatile memory device, is susceptible to a deeper erase condition, as described above. In some implementations, process 500 may include identifying the block as a block that is scheduled for an erase operation. In some implementations, the wordline is a wordline that is most susceptible to the deeper erase condition out of wordlines of the block.

As further shown in FIG. 5, process 500 may include programming a predetermined bit pattern on the wordline based on determining that the wordline is susceptible to the deeper erase condition (block 520). For example, the controller may program instructions to program a predetermined bit pattern on the wordline based on determining that the wordline is susceptible to the deeper erase condition, as described above. In some implementations, process 500 may include programming the predetermined bit pattern to increase a threshold voltage of the wordline.

As further shown in FIG. 5, process 500 may include performing an erase operation on the block after programming the predetermined bit pattern on the wordline (block 530). For example, the controller may program instructions to perform an erase operation on the block after programming the predetermined bit pattern on the wordline, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
identifying a block of a non-volatile memory device that is scheduled for an erase operation;
determining, using a machine learning model or a data structure, whether a wordline of the block is susceptible to a deeper erase condition before the erase operation, wherein the deeper erase condition causes an erase threshold voltage of a cell, after the erase operation, to decrease below an erase verify voltage, and
wherein the data structure identifies wordlines that are susceptible to deeper erase conditions;
performing a programming operation, on the wordline, to program a predetermined bit pattern on the wordline based on the wordline being susceptible to the deeper erase condition; and
performing the erase operation on the block after performing the programming operation.

2. The method of claim 1, wherein determining whether the wordline is susceptible to the deeper erase condition comprises:
determining a classification of the wordline regarding a susceptibility to the deeper erase condition after determining that the wordline is susceptible to the deeper erase condition; and
determining the predetermined bit pattern based on the classification.

3. The method of claim 1, comprising:
identifying the block as a block that is scheduled for an erase operation prior to determining whether the wordline is susceptible to the deeper erase condition.

4. The method of claim 1, wherein the data structure identifies:
one or more first wordlines, that have been identified as being susceptible to deeper erase conditions, for a first range of program erase cycles, and
one or more second wordlines, that have been identified as being susceptible to deeper erase conditions, for a second range of program erase cycles.

5. The method of claim 1, wherein the machine learning model is included in a plurality of machine learning models associated with different program/erase cycles, and
wherein the method comprises:
determining a number of program/erase cycles of the block; and
selecting the machine learning model based on the number of program/erase cycles of the block.

6. The method of claim 1, wherein the data structure is generated using characterization data that identifies different threshold voltages associated with two overlapped charge states.

7. The method of claim 1, wherein the machine learning model is trained to determine, based on read operations performed on the wordline after the block has been programmed, a first distribution of threshold voltages for a first charge state of the wordline,
wherein the first distribution of threshold voltages for the first charge state is a distribution of threshold voltages of an upper tail, and
wherein determining whether the wordline of the block is susceptible to the deeper erase condition comprises determining whether the wordline of the block is susceptible to the deeper erase condition based on the first distribution of threshold voltages.

8. The method of claim 1, comprising:
performing read operations, on one or more other non-volatile memory devices, to obtain training data for the machine learning model.

9. A system comprising:
a controller, of a non-volatile memory device, to:
identify a block of the non-volatile memory device that is scheduled for an erase operation;
determine, using a machine learning model or a data structure, that a wordline of the block is susceptible to a deeper erase condition before the erase operation,
wherein the deeper erase condition causes an erase threshold voltage of a cell, after the erase operation, to decrease below an erase verify voltage; and
program a predetermined bit pattern on the wordline based on determining that the wordline is susceptible to the deeper erase condition,
wherein the predetermined bit pattern is programmed prior to the erase operation being performed on the block.

10. The system of claim 9, wherein the controller is to:
perform the erase operation on the block after programming the predetermined bit pattern on the wordline.

11. The system of claim 10, wherein the machine learning model comprises a plurality of machine learning models, and
wherein the controller is to:
select the machine learning model, from the plurality of machine learning models, based on a number of program erase cycles of the one or more blocks.

12. The system of claim 9, wherein the controller is to:
determine that the data structure identifies the wordline; and
program a predetermined bit pattern on the wordline based on the data structure identifying the wordline.

13. The system of claim 9, wherein the data structure identifies different wordlines, that have been identified as being susceptible to deeper erase conditions, for different ranges of program erase cycles.

14. The system of claim 9, wherein the wordline is a wordline that is most susceptible to the deeper erase condition.

15. The system of claim 9, wherein, to determine that the wordline is susceptible to the deeper erase condition, the controller is further to:
determine a classification of the wordline regarding a susceptibility to the deeper erase condition; and
determine the predetermined bit pattern based on the classification.

16. The system of claim 9, wherein the controller is to:
identify the block as a block that is scheduled for an erase operation.

17. A computer program product comprising:

one or more computer readable storage media, and program instructions collectively stored on the one or more computer readable storage media, the program instructions comprising:

program instructions to determine that a wordline, of a block of a non-volatile memory device, is susceptible to a deeper erase condition, wherein the deeper erase condition causes an erase threshold voltage of a cell, after an erase operation, to decrease below an erase verify voltage;

program instructions to program a predetermined bit pattern on the wordline based on determining that the wordline is susceptible to the deeper erase condition; and program instructions to perform the erase operation on the block after programming the predetermined bit pattern on the wordline.

18. The computer program product of claim 17, wherein the wordline is a wordline that is most susceptible to the deeper erase condition.

19. The computer program product of claim 17, wherein the program instructions comprise:

program instructions to identify the block as a block that is scheduled for an erase operation.

20. The computer program product of claim 17, wherein the program instructions to program the predetermined bit pattern comprise:

program instructions to program the predetermined bit pattern to increase a threshold voltage of the wordline.

* * * * *